(12) United States Patent
Gruber et al.

(10) Patent No.: US 10,788,809 B2
(45) Date of Patent: Sep. 29, 2020

(54) METHOD FOR THE ENABLING OF MACHINE FUNCTIONS ON A SPINNING-MILL MACHINE

(71) Applicant: Rieter Ingolstadt GmbH, Ingolstadt (DE)

(72) Inventors: Thomas Gruber, Ingolstadt (DE); Mario Maleck, Walting (DE); Martin Zipperer, Beilngries (DE); Franz Huettinger, Wolnzach (DE)

(73) Assignee: Rieter Ingolstadt GmbH, Ingolstadt (DE)

( * ) Notice: Subject to any disclaimer, the term of this patent is extended or adjusted under 35 U.S.C. 154(b) by 704 days.

(21) Appl. No.: 15/093,921

(22) Filed: Apr. 8, 2016

(65) Prior Publication Data

US 2016/0299490 A1    Oct. 13, 2016

(30) Foreign Application Priority Data

Apr. 8, 2015   (DE) .................. 10 2015 105 322

(51) Int. Cl.
*G05B 19/408*  (2006.01)
*D01H 1/20*    (2006.01)
*G05B 19/4155* (2006.01)

(52) U.S. Cl.
CPC .......... *G05B 19/408* (2013.01); *D01H 1/20* (2013.01); *G05B 19/4155* (2013.01); *G05B 2219/36542* (2013.01); *G05B 2219/45191* (2013.01); *G05B 2219/50154* (2013.01)

(58) Field of Classification Search
CPC ..................................... D01H 1/20
See application file for complete search history.

(56) References Cited

U.S. PATENT DOCUMENTS

| 2004/0133297 A1* | 7/2004 | Vergote | D03D 51/18 |
| | | | 700/140 |
| 2004/0186620 A1* | 9/2004 | Chimomas | G07F 5/18 |
| | | | 700/231 |
| 2009/0062930 A1* | 3/2009 | Aureli | H04L 29/08846 |
| | | | 700/7 |

(Continued)

FOREIGN PATENT DOCUMENTS

| CH | 698536 B1 * | 8/2009 | ......... G05B 19/0428 |
| CN | 101372772 A | 2/2009 | |

(Continued)

OTHER PUBLICATIONS

European Patent Office Search Roport, dated Aug. 11, 2016.
German Patent Office Search Report dated Jan. 27, 2016.
Chinese Office Action, dated Sep. 29, 2019.

*Primary Examiner* — Robert A Cassity
(74) *Attorney, Agent, or Firm* — Dority & Manning, P.A.

(57) ABSTRACT

A method is provided for the enabling of machine functions on a spinning-mill machine comprising multiple components. The method includes transfer of machine-specific data to an enabling device that is physically remote from the spinning-mill machine; evaluation of the machine-specific data through the enabling device; selection of enabling data through the enabling device depending on the machine-specific data; transfer of the enabling data to the spinning-mill machine; and enabling of specific machine functions depending on the enabling data.

11 Claims, 1 Drawing Sheet

(56) References Cited

U.S. PATENT DOCUMENTS

| | | | | |
|---|---|---|---|---|
| 2009/0222885 A1* | 9/2009 | Batke | ............... | H04L 63/061 |
| | | | | 726/1 |
| 2010/0005303 A1* | 1/2010 | Ng | ............... | H04L 9/3271 |
| | | | | 713/171 |
| 2013/0184847 A1* | 7/2013 | Fruh | ............... | G05B 19/41875 |
| | | | | 700/109 |
| 2015/0029006 A1* | 1/2015 | Kamada | ............... | G08C 17/02 |
| | | | | 340/12.5 |
| 2017/0146989 A1* | 5/2017 | Locatelli | ............... | D01H 13/32 |

FOREIGN PATENT DOCUMENTS

| | | |
|---|---|---|
| DE | 103 40 234 A1 | 4/2005 |
| DE | 10 2005 002 472 A1 | 7/2006 |
| DE | 10 2007 052 677 A1 | 5/2009 |
| EP | 2 573 635 A1 | 3/2013 |
| EP | 2 573 651 A1 | 3/2013 |
| JP | H 03193940 A | 8/1991 |
| WO | WO 2016/016739 A1 | 2/2016 |

\* cited by examiner

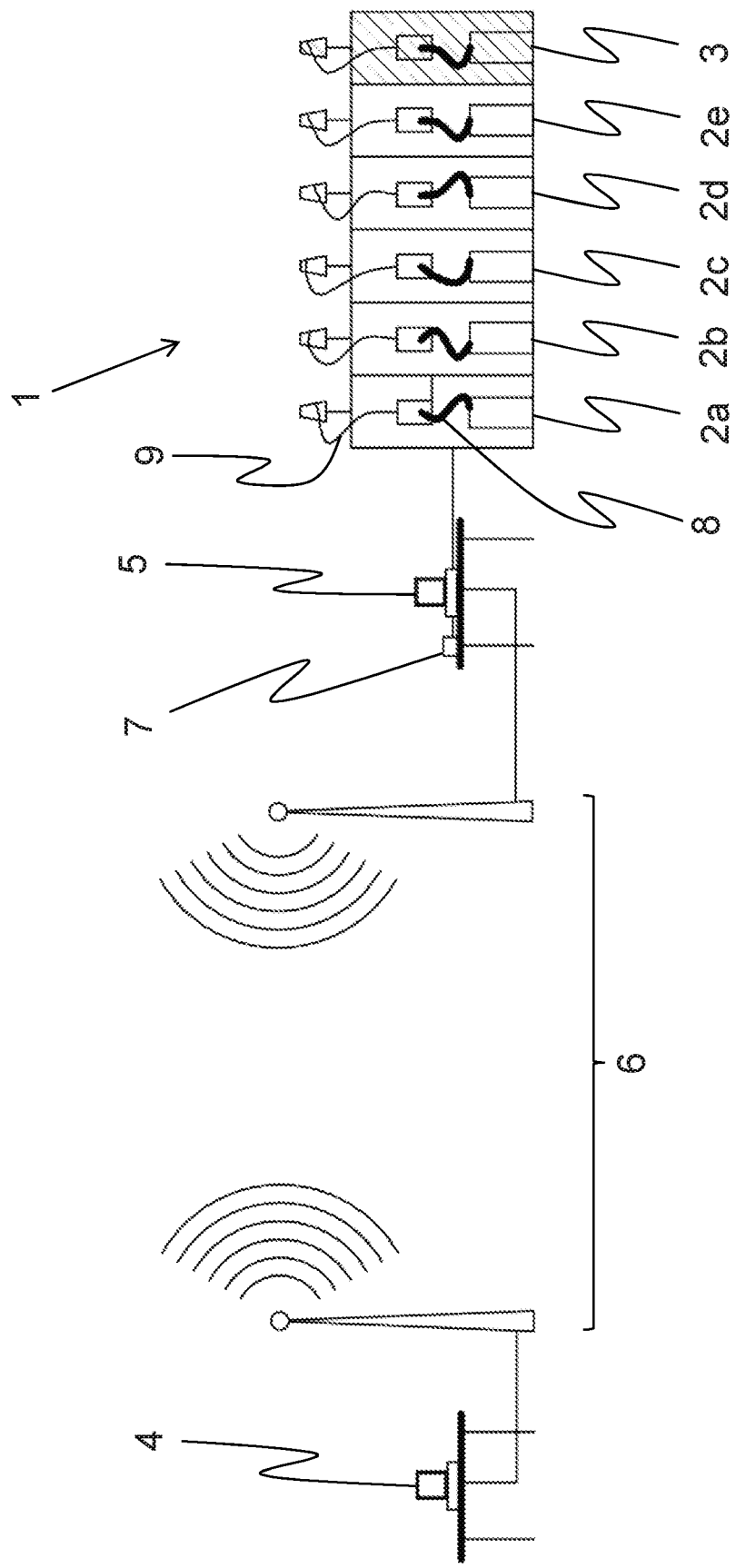

METHOD FOR THE ENABLING OF MACHINE FUNCTIONS ON A SPINNING-MILL MACHINE

FIELD OF THE INVENTION

The present invention relates to a method for the enabling of machine functions on a spinning-mill machine comprising multiple components. In doing so, machine-specific data is transferred to an enabling device remote from the spinning-mill machine. The machine-specific data is analyzed through the enabling device. The enabling device selects enabling data depending on the machine-specific data. The enabling data is transferred to the spinning-mill machine and machine functions are enabled depending on the enabling data.

BACKGROUND

DE 10 2005 002 472 A1 proposes a textile machine and a software protection device with a programmable controller, a data storage device for receiving software enabling data and a data interface, which is connectable for the transfer of data between the data storage device and the controller of the textile machine. A disadvantage of such a software protection device is that licenses are not provided and/or controlled by a higher authority. Such a textile machine is easy to manipulate.

SUMMARY OF THE INVENTION

Thus, a task of the present invention is to provide a method that is as secure and thus as simple as possible for the enabling of machine functions of a spinning-mill machine. Additional objects and advantages of the invention will be set forth in part in the following description, or may be obvious from the description, or may be learned through practice of the invention.

The objects are solved by a method for the enabling of machine functions with the characteristics as described and claimed herein.

A method for the enabling of machine functions on a spinning-mill machine comprising multiple components is proposed. Initially, machine-specific data is transferred to an enabling device remote from the spinning-mill machine. Machine-specific data is all data that characterizes a spinning-mill machine. These are, for example, the type of spinning-mill machine (rotor spinning machine, draw frame, etc.), its designation and/or serial number, prior operating time, the size of the spinning-mill machine (such as the number of spinning units of a spinning-mill machine formed as a spinning machine), the location and/or details regarding the previous license of the operator of the spinning-mill machine. With the license, machine functions are activated, such that the spinning-mill machine can be operated depending on the license acquired by the operator. If the spinning-mill machine is operated without a license, the functionality is limited, or the spinning-mill machine cannot even be operated.

The enabling device consists of, for example, a computer system of the manufacturer of the spinning machine or an institution authorized to grant licenses, which is configured to evaluate the received machine-specific data on the basis of corresponding algorithms and/or taking into account existing databases.

The enabling device and the spinning-mill machine can be located in different countries. The transfer of the machine-specific data can take place via electronic means, such as over the Internet and/or via e-mail. If the spinning-mill machine and the enabling device are located in one building or in one premise, the transfer of the machine-specific data may also be carried out via a local network, such as Wi-Fi or an intranet.

After the transfer of the machine-specific data, the data is evaluated by the enabling device. Thereby, the enabling device checks, for example, the size of the spinning-mill machine and the currently used license, and examines whether such data corresponds to the data upon the delivery of the spinning-mill machine. At this point, manipulation of the spinning-mill machine can be detected. Any unauthorized extension of the spinning-mill machine can be recognized by comparing the current machine-specific data with that which was stored upon delivery of the machine.

Thereafter, there is a selection of enabling data by the enabling device depending on the machine-specific data. The enabling data contains information regarding the machine functions of the spinning-mill machine. By means of the enabling data, such as the manufacturer of the spinning-mill machine, new machine functions can be activated, or old machine functions can be blocked. The enabling data may also include a period of time as to how long the spinning-mill machine may be operated, and in what manner. The selection of the enabling data may depend, for example, on a payment by the operator of the spinning-mill machine to the operator of the enabling device. The operation of the spinning-mill machine may be extended, for example, by means of license payments. The enabling data may include an expiration date. After the expiration of the enabling data on a spinning-mill machine, the machine cannot be operated, or can be operated only with basic functions. This increases the commercial security of the operator of the enabling device, in particular the manufacturer of the spinning-mill machine.

Subsequently, the enabling data is transferred back to the spinning-mill machine. This can be performed with the same means as the transfer of the machine-specific data to the enabling device.

Thereupon, specific machine functions are enabled depending on the enabling data. The specific machine functions may comprise the production speed of the spinning-mill machine. Likewise, individual machine sections can be activated by means of the enabling data, such that, once activated, production can take place on a larger number of sections. Of course, machine functions may be limited with specific enabling data. This may be useful if, after the expiration of a license, the operator of a spinning-mill machine makes less license payments to the machine manufacturer. After the expiration of a license, the functionality of the spinning-mill machine is ultimately restricted, or it can no longer be operated. An operator of the spinning-mill machine is forced to make payments to the manufacturer. Thereby, the manufacturer has commercial security.

Security against manipulation of the spinning-mill machine can be increased by the enabling device having to first be contacted in order to take the spinning-mill machine into operation or to be able to activate the most important machine functions. For this purpose, the operator of the spinning-mill machine must send a status, namely the machine-specific data, to the enabling device. Thus, the enabling device can prevent the spinning-mill machine from being operated by unauthorized and/or non-certified entities. In addition, the manufacturer is able to prevent an operator from using the spinning-mill machine beyond an authorized period of time. Specifically, after the expiration of a license, the operator of the spinning-mill machine must newly send the machine-specific data to the enabling device in order to once again receive new enabling data, in particular a license. Only with new enabling data can the spinning-mill machine continue to operate. Thus, the enabling data contain an authorization as to how long and to what extent the spinning-mill machine may/must be used by the operator.

An advantageous further development of the invention is characterized by the fact that the machine-specific data is encrypted prior to the transfer to the enabling device, and is once again decrypted after the transfer, preferably by the enabling device. This can prevent the machine-specific data from being intercepted during transfer, or modified in such a manner that an advantage for the operator of the spinning-mill machine arises from this. An operator could, for example, falsify the data in such a manner that it displays fewer components of the spinning-mill machine than actually exist, with the intention to pay a lower license fee. With the specified encryption, the spinning-mill machine is more secure against manipulation. In this case, an Advanced Encryption Standard (AES), for example with a key length of 128 bits, 192 bits or 256 bits, may be applied as the encryption. Such encryption features a high degree of security.

It is also advantageous if the enabling data is encrypted prior to the transfer to the spinning-mill machine, and is once again decrypted after the transfer, preferably by the spinning-mill machine. Thus, manipulation of the enabling data is thereby prevented. The enabling data contains important information regarding the operation of the spinning-mill machine. For example, an authorization to operate the machine up to a specified point in time may be contained therein. Manipulation, in particular an extension of the operating license, represents a loss of profit for the manufacturer. In this case, an Advanced Encryption Standard (AES) with a key length of 128 bits, 192 bits or 256 bits may be applied.

If the machine-specific data includes a machine ID characterizing the spinning-mill machine, this entails additional advantages. The machine ID is understood as a unique code, in particular a numerical value or a character string, by means of which the spinning-mill machine can be identified. In the simplest case, the machine ID may be the serial number of the spinning-mill machine. However, the machine ID may also include the location of the spinning-mill machine and/or the date of delivery. All such data may be shortened, by the available data forming a hash value. A hash function generating a hash value reduces the data regarding location, delivery date and/or serial number or other data with a predetermined number range. Such a machine ID thereby simplifies the identification of the spinning-mill machine.

Furthermore, it is advantageous if the machine ID is created by retrieving and aggregating individual component IDs characterizing the respective components of the spinning-mill machine. Thus, the machine ID contains information regarding the structure of the spinning-mill machine. With the machine ID, it may be a statement regarding how many sections and/or robots the spinning-mill machine contains. The component ID may contain the serial number, the version number and/or the manufacture date of the component. Thereby, the spinning-mill machine can be accurately identified. In addition, the enabling device can better evaluate the machine-specific data. The components IDs contained therein are likewise evaluated. Thus, upon the receipt of the machine-specific data, the enabling device can detect whether and which components were replaced and/or manipulated without authorization.

It is also advantageous if the machine ID is created prior to the normal operation of the spinning-mill machine, and is transferred to a memory unit of the spinning-mill machine. Thereby, after the transfer, the machine ID remains coupled to the memory unit until individual components of the spinning-mill machine are removed, supplemented and/or modified to a predetermined extent.

Thereby, a memory unit may also not be replaced without authorization. This prevents a memory unit of a spinning-mill machine, for which lower license payments are made, from being used on a different spinning-mill machine, for which higher license payments would usually have to be made. Thereby, a corresponding manipulation can be prevented. However, the operator may be authorized, for example by the manufacturer, to independently exchange certified replacement parts, without the spinning-mill machine being limited in its functionality. This simplifies the operation of the spinning-mill machine for the operator, which need not be contacted upon any modification to the enabling device.

The memory unit may be, for example, a dongle or a module, which is connected to the spinning-mill machine via a network cable, Wi-Fi or a CAN bus. For this purpose, the memory unit features a suitable interface.

Moreover, it is advantageous if, prior to the first transfer to the memory unit, the machine ID is transmitted to a verification unit remote from the spinning-mill machine, is examined there and, only upon a successful verification, is transferred to the memory unit. The verification unit preferably comprises a computer system of the manufacturer or a corresponding authorized party. Through the transfer to the machine ID, the verification unit communicates the structure of the spinning-mill machine, in particular the installed components with their data, such as the manufacture date and/or serial number. Thereupon, the verification unit may examine whether the machine ID corresponds to the expected machine ID. The expected machine ID is known to the verification unit, since it is familiar with the structure. If, without authorization, an operator adds additional components to the spinning-mill machine or otherwise manipulates it, the transferred machine ID does not match the machine ID to be expected. In this case, a successful verification fails to occur, and the machine ID is not transferred back to the spinning-mill machine. In this case, the spinning-mill machine cannot be operated, or at least can only be operated with limitations. This prevents the manipulation of the spinning-mill machine.

With an advantageous further development of the invention, upon a restart of the spinning-mill machine, the current machine ID is initially determined. Subsequently, the current machine ID is compared with the machine ID stored in the memory unit, and specific machine functions are only enabled if the machine ID created upon the restart of the spinning-mill machine matches the machine ID stored in the memory unit, or deviates from it only to a previously defined extent. Upon every restart, there is an examination of whether additional components were added to and/or removed from the spinning-mill machine without authorization. In this case, it is possible that the memory unit, for example, reacts to the removal of components in a more tolerant manner; that is, the memory unit is activated despite the removal of all machine functions. By contrast, with an extension of the spinning-mill machine, the functionality is limited. This prevents manipulation in the structure, in particular the components, of the spinning-mill machine.

It is also advantageous if the machine ID is determined by a controller of the spinning-mill machine, is encrypted prior to transfer to the memory unit, and is once again decrypted by the memory unit, in order to ensure a secure transfer of the machine ID between the controller and the memory unit. Herein, an Advanced Encryption Standard (AES) with a key length of 128 bits, 192 bits or 256 bits may be applied. In doing so, the transfer is more secure, in particular against a manipulation of the machine ID during transfer. A manipulator is interested in, for example, having the manipulated components of a spinning-mill machine appearing to be components verified by the enabling device and/or the verification unit.

The controller of the spinning-mill machine is, for example, a computer, which performs the programs necessary for the operation of the spinning-mill machine. The memory unit may be connected to the computer through a USB port, through a network cable or via Wi-Fi. In addition, the memory unit may also be arranged in the housing of the computer, by which a manipulation of the memory unit is made difficult.

Furthermore, it is advantageous if the controller and the memory unit are mutually authenticated prior to a data transfer taking place between the controller and the memory unit. Thus, the two participants, in this case the controller and the memory unit, can be certain that the particular counterparty is an authorized party. Thus, the unauthorized manipulation of the controller and the memory unit is made more difficult. In particular, it is not possible to replace the controller and/or the memory unit by a knock-off, in order to thereby operate the spinning-mill machine with a falsified license.

If authentication is performed using a challenge-response process, this is an additional advantage. The authentication is even more secure by using this method. Manipulation of the spinning-mill machine is thus made more difficult.

It is advantageous if, after a successful mutual authentication, a connection ID is created, with the help of which subsequent data transfers are verified between the controller and the memory unit. This further increases security. This can prevent the transferred data from being modified, in particular falsified, during the connection between the controller and the memory unit.

It is advantageous if the connection ID is not modified as long as there is a connection between the memory unit and the controller, and that a new connection ID is only created if the specified connection was interrupted and is to be re-established. Thus, the manipulation of the data transfer between the controller and memory unit is made more difficult. If, for example, a device is interposed between the controller and the memory unit for the falsification of data to be transferred, the connection must be interrupted at least briefly. However, this interruption once again requires an authentication. Yet, it fails at that point, because of the extra device.

An additional advantageous further development of the invention is that a hash value of such data is also transferred upon the transfer of data, in particular the machine-specific data, the machine ID and/or the component IDs. The hash value may also be assembled with such data into a so-called "fingerprint." Such a fingerprint may be encrypted, such that falsifying the fingerprint (and thus such data) continues to be made more difficult.

By means of a hash value, such data is secured against falsification. The hash value is also easy to calculate. A characteristic of the hash value is that a modification of such data leads to a completely different hash value. An example of a particularly simple manipulation of such data would be that, when the license expires, a manipulator merely increases the number of years by one year. Thus, the manipulator would only have to modify one digit in order to save license fees for one year. However, such a modification of such data leads to a completely different hash value, with which the enabling device will immediately recognize that a modification is present. For the purpose of comparison, the enabling device has the hash value of the unmodified data. For example, this hash value was produced and saved upon the last receipt of the machine-specific data. A method for producing the hash value is, for example, a Secure Hash Algorithm, in particular SHA-3.

It is also advantageous if the machine-specific data, the machine ID, the component IDs, and/or the enabling data are stored in the memory unit in encrypted form. This increases security, since the data stored in the memory unit cannot be manipulated. Additionally or alternatively, security is increased if the specified data can be read only by authorized units. Such units may be the controller, the enabling device, the verification unit, and/or another device. Such devices may be, for example, mobile diagnostic devices and/or computer units, by means of which a service person is able to check and/or modify the data stored in the memory unit.

BRIEF DESCRIPTION OF THE DRAWING

Additional advantages of the invention are described in the following embodiment. The following is shown:

FIG. 1 a schematic representation of a spinning-mill machine with a data transfer to an enabling device.

DETAILED DESCRIPTION

Reference will now be made to embodiments of the invention, one or more examples of which are shown in the drawings. Each embodiment is provided by way of explanation of the invention, and not as a limitation of the invention. For example features illustrated or described as part of one embodiment can be combined with another embodiment to yield still another embodiment. It is intended that the present invention include these and other modifications and variations to the embodiments described herein.

FIG. 1 shows a schematic representation of a spinning-mill machine 1 along with an enabling device 4 physically remote from the spinning-mill machine 1. In this embodiment, the spinning-mill machine is formed as a spinning-mill machine with several sections 2a-2e, 3, at which a yarn 9 (for the sake of simplicity, the sliver and the yarn are provided with a reference sign in only one section) is produced from a sliver 8. The spinning-mill machine 1 is operated by a controller 5. The controller 5 may be a computer that contains the software required for operation of the machine 1. A memory unit 7 is connected to the controller 5. This can be connected to the controller 5 by means of a data cable, in particular a network cable, or the like. However, the memory unit 7 may also be arranged in the housing of the controller 5. Likewise, the memory unit 7 could be designed as, for example, a dongle, and inserted directly into, for example, a USB port of the controller 5.

Upon every restart of the spinning-mill machine 1, machine-specific data, in particular the machine ID and/or the component IDs, of the sections 2a-2e, 3, are queried. In this embodiment, sections 2a-2e are components authorized by the manufacturer. However, section 3 is shown as an example of a section added without authorization. The controller 5 receives, for example through a CAN-connection, the component IDs of all the sections 2a-2e, 3, and assembles them with other data, such as the operating time, the serial number and/or the currently used license for the machine-specific data. Additionally or alternatively, a hash value can be added by such machine-specific data, in order to protect the data from manipulation.

The collected machine-specific data, the machine ID and/or the components IDs, are compared with the existing enabling data that can be stored in the memory unit 7. Such enabling data includes, for example, the period of time as to how long the spinning-mill machine 1 can be operated. Advantageously, the enabling data also contains a list of the component IDs enabled by the enabling device 4, in particular the manufacturer. In the embodiment shown, the enabling data contains the component IDs of sections 2a-2e, since such data was provided upon the construction of the spinning-mill machine 1, or since license fees have been paid only for the five sections 2a-2e. It is apparent to the controller 5 that section 3 is not included in the enabling data as a component ID. The controller 5 may then limit the functionality of the spinning-mill machine 1, or stop the entire operation of the spinning-mill machine 1.

The machine-specific data can also be transferred to the enabling device 4 by means of a data transfer 6. The data transfer 6, here schematically shown, may be designed, for example, as Wi-Fi, if the enabling device 4 and the controller 5 are arranged on a company's premises or in one building. However, the data transfer 6 may also be formed as a network cable. By contrast, if the enabling device 4 and the controller 5 are located in different countries, the data transfer 6 may also take place via the Internet and/or e-mail.

The enabling device 4 evaluates the received machine-specific data and, when evaluating the machine-specific data, detects that the unauthorized section 3 is also being operated.

The enabling device 4 thereupon selects enabling data based on the machine-specific data. The enabling data is subsequently transferred back to the controller 5 by means of data transfer 6, in particular over Wi-Fi, the Internet and/or another network, and are stored in the memory unit 7. Herein, each data transfer 6 is advantageously carried out in encrypted form, such that the machine-specific data and/or the enabling data are secure from manipulation.

If the enabling data arrives at the spinning-mill machine 1, it is stored in the memory unit 7. A secure connection is established between the controller 5 and the memory unit 7; in particular, an authentication takes place between the two participants. Furthermore, the connection between the memory unit 7 and the controller 5 is encrypted, in order to protect the enabling data from manipulation.

The controller 5 then activates specific machine functions depending on the enabling data. This may involve the operation of all six sections 2a-2e 3, if, for example, the operator has increased its license payments compared to the previous payments.

The invention is not limited to the illustrated and described embodiments. Variations within the framework of the claims, such as a combination of features, are also possible, even if such are presented and described in different embodiments.

LIST OF REFERENCE SKINS

1 Spinning-mill machine
2 Certified sections
3 Unauthorized section
4 Enabling device
5 Controller of the spinning-mill machine
6 Data transfer
7 Memory unit
8 Sliver
9 Yarn

The invention claimed is:

1. A method for enabling machine functions on a spinning-mill machine that includes multiple components used in performing the machine functions to produce a yarn at individual sections of the spinning-mill machine, the method comprising:
   transferring machine-specific data from the spinning-mill machine to an enabling device that is physically remote from the spinning-mill machine;
   with the enabling device, evaluating the machine-specific data;
   with the enabling device, selecting enabling data that is dependent on the machine-specific data, wherein the enabling data determines which of the machine functions at the individual sections are authorized by a license for operation;
   transferring the enabling data from the enabling device to the spinning-mill machine;
   using the enabling data at the spinning-mill machine to enable the machine specific functions to produce the yarn at the individual sections that are authorized by the license for operation and to limit or disable the machine specific functions at the individual sections that are not authorized by a license for production of the yarn;
   wherein the machine-specific data includes a machine ID that characterizes the spinning-mill machine, the machine ID further including individual component IDs characterizing the individual components of the spinning-mill machine that are subject to the license for operation;
   wherein the machine ID is stored in a memory unit of the spinning-mill machine; and;
   wherein, prior to the transfer of the machine ID to the memory unit, the machine ID is transmitted to a remote verification unit for verification of the individual component IDs, and only upon a successful verification, is then transferred to the memory unit.

2. The method according to claim 1, wherein the machine-specific data is encrypted prior to the transfer to the enabling device, and is decrypted after the transfer by the enabling device.

3. The method according to claim 2, wherein the enabling data is encrypted prior to the transfer to the spinning-mill machine, and is decrypted after the transfer by the spinning-mill machine.

4. The method according to claim 1, wherein the machine ID is created prior to a start-up operation of the spinning-mill machine, and remains coupled to the memory unit until the individual components of the spinning-mill machine are removed, supplemented, or modified to a predetermined extent.

5. The method according to claim 4, wherein upon a subsequent restart of the spinning-mill machine, a current machine ID is determined and compared with the machine ID stored in the memory unit, wherein specific machine functions are only enabled if the current machine ID created upon the restart of the spinning-mill machine matches or deviates within a defined extent the machine ID stored in the memory unit.

6. The method according to claim 4, wherein the machine ID is determined by a controller of the spinning-mill machine, is encrypted prior to transfer to the memory unit, and is decrypted by the memory unit in order to ensure a secure transfer of the machine ID between the controller and the memory unit.

7. The method according to claim 6, wherein the controller and the memory unit are mutually authenticated prior to a data transfer of the encrypted machine ID taking place between the controller and the memory unit.

8. The method according to claim 7, wherein the mutual authentication is performed using a challenge-response process.

9. The method according to claim 7, characterized in that, after a successful mutual authentication, a connection ID is created and used for verifying subsequent data transfers of machine IDs between the controller and the memory unit.

10. The method according to claim 9, wherein the connection ID is not modified as long as there is a connection between the memory unit and the controller, wherein a new connection ID is created if the specified connection is interrupted and needs to be re-established.

11. The method according to claim 4, wherein the machine-specific data, the machine ID, the component IDs, and the enabling data are stored in the memory unit in encrypted form.

* * * * *